United States Patent
Fazzini

(10) Patent No.: US 12,315,471 B2
(45) Date of Patent: *May 27, 2025

(54) GAMUT MAPPING USING LUMINANCE PARAMETERS

(71) Applicant: Imagination Technologies Limited, Kings Langley (GB)

(72) Inventor: Paolo Fazzini, Rome (IT)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,565

(22) Filed: Aug. 14, 2023

(65) Prior Publication Data

US 2024/0153470 A1 May 9, 2024

Related U.S. Application Data

(63) Continuation of application No. 17/674,816, filed on Feb. 17, 2022, now Pat. No. 11,727,895, which is a
(Continued)

(30) Foreign Application Priority Data

Jun. 6, 2014 (GB) ..................................... 1410065

(51) Int. Cl.
*G09G 5/02* (2006.01)
*G09G 5/06* (2006.01)
(Continued)

(52) U.S. Cl.
CPC ................. *G09G 5/02* (2013.01); *G09G 5/06* (2013.01); *H04N 1/6061* (2013.01); *H04N 9/67* (2013.01);
(Continued)

(58) Field of Classification Search
CPC .... G09G 5/02; G09G 5/06; G09G 2320/0666; G09G 2340/06; G09G 2360/02;
(Continued)

(56) References Cited

U.S. PATENT DOCUMENTS 5,185,661 A 2/1993 Ng
5,233,684 A * 8/1993 Ulichney .............. G06T 11/001
345/604

(Continued)

FOREIGN PATENT DOCUMENTS

WO 2007/004194 A2 1/2007
WO 2011/143117 A2 11/2011

*Primary Examiner* — Hai Tao Sun
(74) *Attorney, Agent, or Firm* — Potomac Law Group, PLLC; Vincent M DeLuca

(57) ABSTRACT

A colour processor for mapping an image from source to destination colour gamuts has an input for receiving a source image including a plurality of source colour points expressed according to the source gamut; a colour characterizer configured to, for each source colour point in the source image, determine a position of intersection of a curve with the boundary of the destination gamut; and a gamut mapper configured to, for each source colour point in the source image: if the source colour point lies inside the destination gamut, apply a first translation factor to translate the source colour point to a destination colour point within a first range of values; or if the source colour point lies outside the destination gamut, apply a second translation factor, different to the first translation factor, to translate the source colour point to a destination colour point within a second range of values.

20 Claims, 7 Drawing Sheets

Related U.S. Application Data continuation of application No. 16/924,443, filed on Jul. 9, 2020, now Pat. No. 11,289,049, which is a continuation of application No. 14/733,119, filed on Jun. 8, 2015, now Pat. No. 10,748,503.

(51) Int. Cl.
*H04N 1/60* (2006.01)
*H04N 9/67* (2023.01)

(52) U.S. Cl.
CPC . *G09G 2320/0666* (2013.01); *G09G 2340/06* (2013.01); *G09G 2360/02* (2013.01); *G09G 2360/08* (2013.01); *G09G 2360/144* (2013.01)

(58) Field of Classification Search
CPC ......... G09G 2360/08; G09G 2360/144; H04N 1/6061; H04N 9/67
USPC .......................................... 345/590
See application file for complete search history.

(56) References Cited

U.S. PATENT DOCUMENTS

| | | | |
|---|---|---|---|
| 5,883,632 A * | 3/1999 | Dillinger | H04N 1/6052 345/589 |
| 6,154,217 A * | 11/2000 | Aldrich | G06T 11/001 345/589 |
| 6,744,534 B1 | 6/2004 | Balasubramanian et al. | |
| 7,893,945 B2 * | 2/2011 | Ramanath | G06T 11/001 345/589 |
| 2002/0000993 A1 | 1/2002 | Deishi et al. | |
| 2003/0122845 A1 | 7/2003 | Lee et al. | |
| 2005/0248785 A1* | 11/2005 | Henley | H04N 1/6058 358/1.9 |
| 2006/0197848 A1 | 9/2006 | Ogawa | |
| 2008/0043260 A1 | 2/2008 | Ramanath et al. | |
| 2009/0022395 A1 | 1/2009 | Cho et al. | |
| 2009/0122073 A1* | 5/2009 | Higgins | G09G 3/2003 345/590 |
| 2012/0139913 A1 | 6/2012 | Ben-Chorin et al. | |
| 2013/0050245 A1 | 2/2013 | Longhurst et al. | |

* cited by examiner

GAMUT MAPPING USING LUMINANCE PARAMETERS

CROSS-REFERENCE TO RELATED APPLICATIONS AND CLAIM OF PRIORITY

This application is a continuation under 35 U.S.C. 120 of copending application Ser. No. 17/674,816 filed Feb. 17, 2022, now U.S. Pat. No. 11,727,895, which is a continuation of prior application Ser. No. 16/924,443 filed Jul. 9, 2020, now U.S. Pat. No. 11,289,049, which is a continuation of prior application Ser. No. 14/733,119 filed Jun. 8, 2015, now U.S. Pat. No. 10,748,503, which claims foreign priority under 35 U.S.C. 119 from United Kingdom Application No. 1410065.5 filed Jun. 6, 2014, the contents of which are incorporated by reference herein in their entirety.

BACKGROUND OF THE INVENTION

This invention relates to colour processors and methods for mapping between colour gamuts.

In digital image processing, the values describing the colours of an image can often be manipulated so as to end up outside the possible range of colours available in the working colour gamut. This is a particular problem when converting an image between colour gamuts because values lying towards the extremes of the possible range of colours in the source colour gamut will often end up outside the possible range of colours in the destination colour gamut.

This problem has been addressed by clamping or clipping each of the colour channels of the destination gamut to its limits such that any values which exceed the limit of a destination colour channel are simply clamped to the limit of that channel. Colours which do not lie outside the destination gamut are left unchanged. However, this solution leads to unrealistic colours and loss of detail in colours in the region of the boundary of the destination colour gamut. An improvement on this technique has been to clamp the colours of an image which lie outside the destination gamut to values on the surface of the destination colour gamut whilst maintaining constant luma and hue of those values. Only the saturation of the colour therefore changes. Perceptually, this generally yields a processed image which suffers less from colour distortion.

Such gamut mappings are typically performed in YUV space because points of constant luma (Y) and hue in YUV space lie along a conveniently described line. The relationship between luminance $L_{UV}$, hue $H_{UV}$ and saturation $S_{UV}$, and the parameters of the YUV colour space can be expressed as follows:

$$L_{UV} = Y \quad (1)$$

$$H_{UV} = \tan^{-1}\left(\frac{V}{U}\right)$$

$$S_{UV} = \sqrt{U^2 + V^2}$$

In YUV space, a destination colour value would therefore conventionally be found where the line of constant luminance and hue passing through the source point in YUV space meets the surface of the destination colour gamut as expressed in YUV space. For example, FIG. 1 shows an RGB colour gamut 101 which is cuboid in shape in the YUV colour space 102. A colour value 103 lying outside of the RGB gamut (e.g. a colour value in a YUV image being converted into the RGB gamut) can be clamped to a value 104 on the surface of the RGB cuboid along a line 105 of constant luminance and hue such that the Y value of the destination point 104 on the surface of the RGB cuboid has the same Y value as the source point 103, and the hue function of U and V at the source and destination points yield the same hue value. Converted colour points inside the RGB gamut are not modified.

Colour values can be readily converted between RGB and YUV descriptions. For example, conversion between an sRGB colour space and YUV can be performed according to the following linear transformations:

$$\begin{pmatrix} Y \\ U \\ V \end{pmatrix} = \begin{pmatrix} 0.299 & 0.587 & 0.114 \\ -0.147 & -0.289 & 0.436 \\ 0.615 & -0.515 & -0.100 \end{pmatrix} \begin{pmatrix} R \\ G \\ B \end{pmatrix}. \quad (2)$$

$$\begin{pmatrix} R \\ G \\ B \end{pmatrix} = \begin{pmatrix} 1 & 0 & 1.140 \\ 1 & -0.395 & -0.581 \\ 1 & 2.032 & 0 \end{pmatrix} \begin{pmatrix} Y \\ U \\ V \end{pmatrix}.$$

A second improvement to the simplistic technique of clamping colour values to the limits of the respective colour channels is to scale all of the colours in a source image such that they lie within the destination gamut. This gamut scaling is typically performed at constant luminance and hue and can again be expressed in the YUV colour space as a translation of a source colour value to a destination colour value along a line of constant luminance and hue. With gamut scaling, however, all of the colour values of a source image are converted, and the destination colour values can lie within as well as on the surface of the destination colour gamut.

FIG. 2 shows a two-dimensional representation of such a gamut scaling operation, with a source colour value 201 being mapped to a destination colour value 202 (FIG. 2 could be a slice through FIG. 1 at constant luma, Y). It can be seen that the source value 201 lies within the source colour gamut 203, which extends out to point 206 on the indicated line 208 of constant luminance and hue. The source value is consequently mapped to a colour value 202 within the destination gamut 204, which extends out to point 207 on the indicated line 208 of constant luminance and hue.

Gamut colour scaling is typically performed by means of a scaling factor along line 208 such that the point 206 on the surface of the source gamut is mapped to point 207 on the surface of the destination gamut. All other points between the luma axis 205 and the surface of the source gamut can be scaled by the same scaling factor so as to compress source colour values lying along the line of constant luminance and hue into the destination gamut 204. Gamut scaling therefore preserves the relationship between colours in an image but it necessarily leads to the modification of all the colours in an image, even if those colours lie entirely within the destination gamut. This can lead to large and unnecessary changes to images when only a small number of pixels have colours lying outside the destination colour gamut.

Both gamut clamping or scaling can introduce significant colour distortions into a processed image that is converted between colour gamuts. This can be particularly noticeable in videos whose frames are converted between colour gamuts.

BRIEF SUMMARY OF THE INVENTION

According to a first aspect of the present invention there is provided a colour processor for mapping an image from a source colour gamut to a destination colour gamut in an operating colour space, the colour processor comprising:
- an input for receiving a source image comprising a plurality of source colour points expressed according to the source colour gamut;
- a colour characterizer configured to, for each source colour point in the source image, determine a first scaling parameter indicative of a relationship between the position of the source colour point and a position of intersection of the boundary of the destination colour gamut with a curve defined according to a predetermined set of constraints so as to pass through the source colour point; and
- a gamut mapper configured to, for each source colour point in the source image and in dependence on the first scaling parameter:
  - if the source colour point lies inside the destination colour gamut, apply a first translation factor so as to translate the source colour point to a destination colour point within a first range of values on the respective curve; or
  - if the source colour point lies outside the destination colour gamut, apply a second translation factor, different to the first translation factor, so as to translate the source colour point to a destination colour point within a second range of values on the respective curve;

the first and second ranges of values lying within the destination colour gamut.

The gamut mapper may be configured to calculate the second translation factor in dependence on the first scaling parameter.

The colour characterizer may be further configured to, for each source colour point in the source image, determine a second scaling parameter indicative of a relationship between the position of the source colour point and a position of intersection of the boundary of the source colour gamut with the respective curve, and the gamut mapper may be configured to calculate the first translation factor in dependence on the first and second scaling parameters The first and second ranges of values on each curve may be adjacent ranges delineated by a first transition point and the gamut mapper may be configured to determine each first transition point in dependence on a user-selected variable.

The predetermined set of constraints may be so as to maintain two or more of the following colour characteristics substantially constant at all colour points along the curve: luminance, hue, chrominance, brightness, lightness, colourfulness, saturation.

The colour characterizer may be configured to calculate each of the first and second scaling parameters as a ratio of the position of the source colour point on the curve with respect to the position of intersection of the boundary of the respective source or destination colour gamut with the curve The operating colour space may be a YUV colour space and the predetermined set of constraints act such that the curve represents a line of constant luminance and hue.

The gamut mapper may be configured to determine, in respect of each of the source or destination colour gamuts, the translation factor required to multiply the U and V coordinates of the source colour point so as to translate the source colour point along the curve to the boundary of the respective source or destination colour gamut.

The gamut mapper may be configured to determine the destination colour point by multiplying the U and V coordinates of the source colour point by the first or second translation factor, as applicable to the source colour point.

The first range of values on the curve may extend between the centre of the destination colour gamut and a first transition point, and the second range of values on the curve may extend between the first transition point and the boundary of the destination colour gamut.

The gamut mapper may be configured to apply the first translation factor only to a first subset of the source colour points lying inside the destination colour gamut and to leave a second subset of the source colour points lying inside the destination colour gamut unchanged, the second subset of source colour points lying between the centre of the destination colour gamut and a second transition point and the first subset of the source colour points lying between the second transition point and the destination colour gamut boundary.

The gamut mapper may be configured to clip the source colour point to the destination gamut boundary if, on applying the second translation factor, the destination colour point would lie outside the destination gamut.

The colour processor may further comprise a colour space converter configured to convert the plurality of translated colour points from the operating colour space to a destination colour space so as to provide an output image expressed according to the destination colour space and destination colour gamut.

According to a second aspect of the present invention there is provided a method for mapping an image from a source colour gamut to a destination colour gamut in an operating colour space, the method comprising:
- receiving a source image comprising a plurality of source colour points expressed according to the source colour gamut; and
- for each source colour point in the source image:
  - determining a first scaling parameter indicative of a relationship between the position of the source colour point and a position of intersection of the boundary of the destination colour gamut with a curve defined according to a predetermined set of constraints so as to pass through the source colour point;
  - determining whether the source colour point lies inside or outside the destination colour gamut, and in dependence on the first scaling parameter:
    - if the source colour point lies inside the destination colour gamut, applying a first translation factor so as to translate the source colour point to a destination colour point within a first range of values on the respective curve; or
    - if the source colour point lies outside the destination colour gamut, applying a second translation factor, different to the first translation factor, so as to translate the source colour point to a destination colour point within a second range of values on the respective curve;

the first and second ranges of values lying within the destination colour gamut.

According to a third aspect of the present invention there is provided a colour processor for mapping an image from a source colour gamut to a destination colour gamut in an operating colour space, the colour processor comprising:
- an input for receiving a source image comprising a plurality of source colour points expressed according to the source colour gamut; and
- a gamut mapper configured to, for source colour points lying outside the destination colour gamut:
  - identify a mapping operator for translating a source colour point to a destination colour point within the destination colour gamut along a curve of constant hue and varying luminance, the mapping operator being arranged to shift the luminance towards the luminance value at the centre of the destination colour gamut, the shift in luminance being greatest for source colour points furthest from the centre of the destination colour gamut; and apply the mapping operator to the source colour point so as to translate the source colour point to the destination colour point.

The operating colour space may be a YUV colour space and the centre of the destination colour gamut is at the origin of the YUV colour space at U=0, V=0, Y=0.5.

The mapping operator may be adapted to modify the luminance of each source colour point in dependence on the square of the distance of the source colour point from the axis U=V=0.

The mapping operator may be adapted to modify the luminance of each source colour point in dependence on the maximum magnitude of the U and V coordinates in the operating colour space of the source colour point.

The mapping operator may be adapted to modify the luminance of each source colour point in dependence on a polynomial function of the Y coordinate of the source colour point, the degree of the polynomial function being odd.

The polynomial function may be selected such that its maxima in magnitude lie substantially at the Y values of first and second vertices of a surface defining the boundary of the destination colour gamut in the operating space, the first vertex being the vertex of the surface having the greatest Y value and the second vertex being the vertex of the surface having the smallest Y value.

The gamut mapper may be configured to determine the coefficients of the polynomial function in dependence on one or more user-selected variables.

The destination colour gamut may be an RGB colour gamut.

According to a fourth aspect of the present invention there is provided a method for mapping an image from a source colour gamut to a destination colour gamut in an operating colour space, the method comprising:

receiving a source image comprising a plurality of source colour points expressed according to the source colour gamut;

for source colour points lying outside the destination colour gamut, identifying a mapping operator for translating a source colour point to a destination colour point within the destination colour gamut along a curve of constant hue and varying luminance, the mapping operator being arranged to shift the luminance towards the luminance value at the centre of the destination colour gamut, the shift in luminance being greatest for source colour points furthest from the centre of the destination colour gamut; and applying the mapping operator to the source colour point so as to translate the source colour point to the destination colour point.

In embodiments of the invention, a non-transitory machine readable storage medium having stored thereon machine readable instructions that, when processed at a computer system for generating a manifestation of an integrated circuit, cause the computer system to generate a manifestation of a colour processor as described herein.

In embodiments of the invention, a non-transitory machine readable storage medium having stored thereon machine readable instructions that, when processed at a computer system, cause the computer system to implement the methods of mapping an image from a source colour gamut to a destination colour gamut.

BRIEF DESCRIPTION OF THE DRAWINGS

The present invention will now be described by way of example with reference to the accompanying drawings. In the drawings.

DETAILED DESCRIPTION

The following description is presented by way of example to enable any person skilled in the art to make and use the invention. The present invention is not limited to the embodiments described herein and various modifications to the disclosed embodiments will be readily apparent to those skilled in the art.

There is provided a processor, which could be embodied in software or hardware, for mapping a source image between colour gamuts. Such a processor is referred to herein as a "colour processor".

Figure 5:
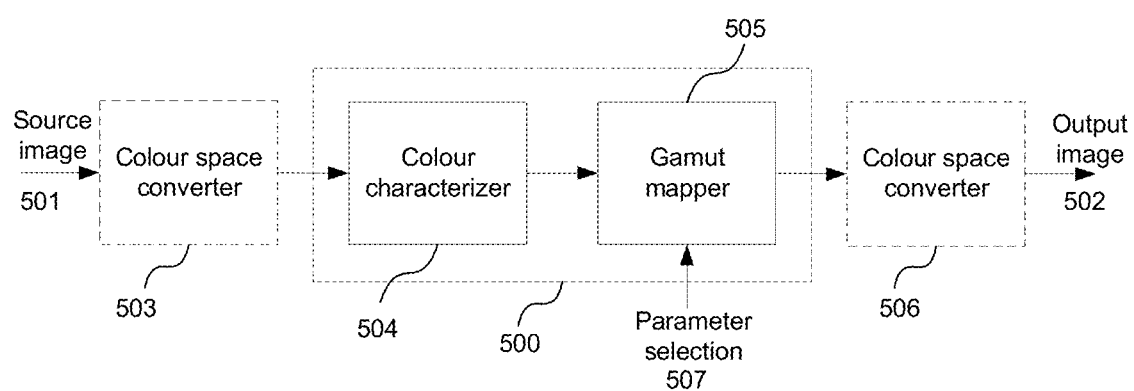
FIG. 5 is a schematic diagram of an image processor.

FIG. 5 is a schematic diagram of a colour processor 500 configured to map the source colour gamut of a source image 501 to a destination colour gamut for an output image 502. The source image could be the output of an image processing pipeline which operates with an extended colour gamut, and the output image might have a more limited colour gamut (e.g. sRGB) suitable for display on a display screen. The colour processor includes a colour characterizer 504 and a gamut mapper 505 which in the example that will now be described operates in the YUV colour space. More generally however, the colour processor could operate in any colour space, including non-linear colour spaces, with the principles set out below being applied to that colour space according to its particular characteristics.

Colour space converter 503 is used to convert the source image 501 from the colour space in which it is encoded into the colour space in which the colour processor is configured to operate. Colour space converter 506 is used to convert the output of the colour processor from the colour space in which the colour processor is configured to operate into the desired colour space for the output image 502 (e.g. an sRGB colour space for a display screen). If the image processor operates in the same colour space according to which one or both of the source and output images are encoded, then one or both of the colour space converters 503 and 506 will not be required.

In the examples which will now be described, the source image 501 is a YUV encoded image from an image processor and the output image 502 is an RGB encoded image. The colour processor 500 operates in the same YUV colour space as the input image and colour space converter 503 is not therefore required. Colour space converter 506 is configured to convert the output of the colour processor from YUV into the desired RGB colour space. Such conversion could, for example, be performed according to the transform given in equation (2) above. The colour processor 500 is configured to ensure that the colours of the source image are mapped into the available gamut of colours of the output image 503.

Figure 3:
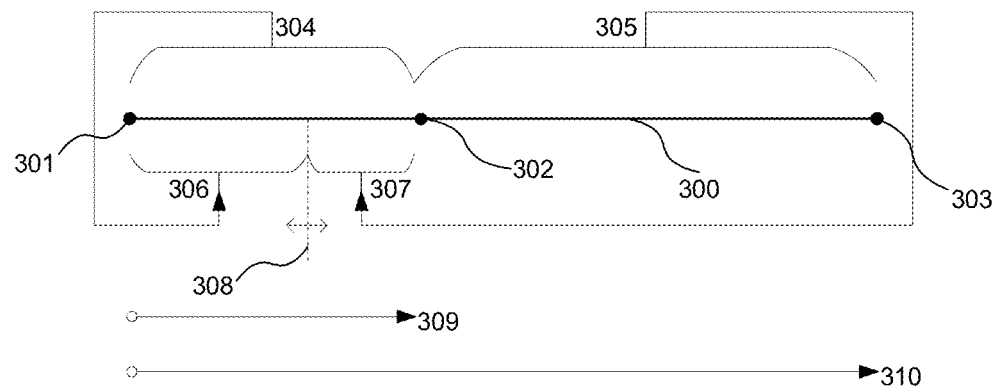
FIG. 3 illustrates a 2-piecewise gamut mapping.
Figure 4:
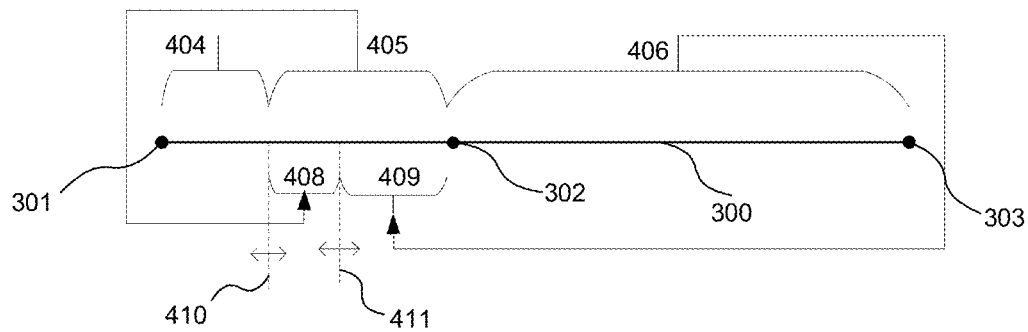
FIG. 4 illustrates a 3-piecewise gamut mapping.

From the relationships between Y, U, V and luminance, hue and saturation shown above in equation set (1), transforming from a point (Y,U,V) to a point (Y',U',V') in YUV colour space whilst maintaining constant luminance and hue but allowing saturation to vary can be expressed as:

$$Y' = Y$$

$$U' = \tau U$$

$$V' = \tau V \quad (3)$$

where $\tau$ is a translation factor. Thus, for a given colour point (Y,U,V), the corresponding line 300 (e.g. as shown in FIGS. 3 and 4, described below) is given by the set of points (Y',U',V') found by varying $\tau$ between 0 and 1 such that U and V change in proportion to one another and Y is fixed.

A point (Y',U',V') can in fact be expressed directly in RGB space as the point (R',G',B') using the coordinates (R,G,B) of the source point (Y,U,V) in RGB space:

$$R' = \tau R + (1-\tau)Y$$

$$G' = \tau G + (1-\tau)Y$$

$$B' = \tau B + (1-\tau)Y$$

It follows that gamut mapper 505 can be configured to directly output the colour points of an output image expressed in RGB format and colour space converter 506 is not required.

Parametric Gamut Mapping

In the following examples, the colour processor is configured to perform the mapping of a source colour point to a colour point within the destination gamut of the output image along a line of constant luminance and hue. The saturation of the colour point is allowed to vary in accordance with the mechanisms described herein.

The operation of colour processor 500 according to a first example will now be described with reference to FIG. 3. For a given colour in the source image 501, there will be a unique line of constant hue and luminance along which the colour can be transformed in the YUV colour space by means of variation in colour saturation only. This line is shown as line 300 in FIG. 3, which extends over a distance 310 at constant luma between the Y axis 301 of the YUV colour space and the source gamut boundary 303 of the colour gamut of the source image along that given line (in YUV space this is a straight line, but for a colour processor configured to operate in other colour spaces it could be a curve). For purposes of this disclosure, the term "curve" thus encompasses a line, which is a curve with null curvature. Line 300 could correspond to line 105 shown in FIG. 1.

Point 302 on line 300 indicates the destination gamut boundary of the colour gamut of the output image along that line. Colour points lying between 302 and 303 on line 300 (i.e. range 305) therefore lie outside the destination colour gamut and must be mapped to colour points lying within the destination colour gamut between 301 and 302 on the line (i.e. range 304 extending over distance 309). As indicated in FIG. 3, the gamut mapper 505 is configured to map colour points in the source image which already lie within the range 304 of the destination gamut onto a lower range 306 within the destination gamut range 304. And colour points in the source image which lie in range 305 outside the destination gamut in range 305 are mapped to an upper range 307 in the destination gamut range 304.

A given colour point in a source image 501 defines the line of constant hue and luminance 300 for that colour point, such that the line passes through the colour point. In order to identify the value of $\tau$ required to translate a given colour point from its source value to its destination value in YUV colour space, the translation factor $\tau$ can be expressed with respect to a suitable scaling parameter $\gamma$. The scaling parameter $\gamma$ for a given colour point represents the value of $\tau$ in equation (3) above required to move that colour point along its respective line of constant luminance and hue to the destination gamut boundary. $\gamma$ represents a relationship between the position of the source colour point and the destination gamut boundary, and can be considered to be a measure of distance of the source colour point to the destination gamut boundary. In the present example, the value of $\tau$ in equation (3) above required to move the colour point along its respective line of constant luminance and hue to the source gamut boundary is given by $\gamma_S$. This has been found to minimise the colour distortion introduced into the converted image. $\gamma_S$ represents a relationship between the position of the source colour point and the source gamut boundary can be considered to be a measure of distance of the source colour point to the source gamut boundary.

More generally, $\gamma_S$ can take any value in the range $(1, \infty)$ and could be a constant over a source image 501. $\gamma_S$ could be a value determined from a measure of average size of the source and/or destination colour gamuts. The average size of a gamut could be the average distance from the centre of the gamut (typically the origin of the colour space) to the surface of the gamut, as calculated from one or more points on the surface of the gamut (e.g. the vertices, or a sparse sampling of surface points). For example, $\gamma_S$ could be calculated as the ratio of the average size of the source gamut to the average size of the destination gamut. In other examples, $\gamma_S$ could be calculated as the ratio of the maximum size of the source gamut to the maximum size of the destination gamut. Fixing $\gamma_S$ for a frame can reduce the computational demands of the colour space transformation but can lead to colour distortion. In cases where the translated colour points lie outside the destination gamut, those colour points can be clipped to the surface of the destination gamut along the line of constant luma and hue.

Figure 6:
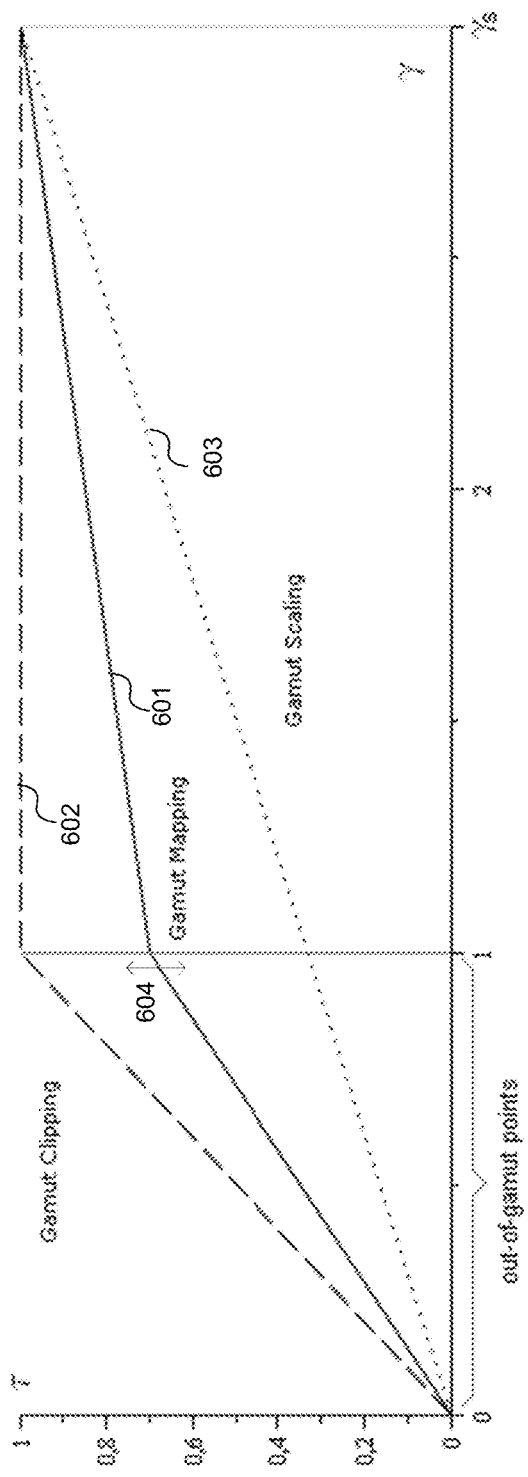
FIG. 6 is a parametric diagram of a 2-piecewise gamut mapping.

Line 601 in FIG. 6 illustrates a relationship between scaling parameter $\gamma$ and translation factor $\tau$ along a line of constant hue and luminance for the first example shown in FIG. 3. Colour points lying outside the destination gamut have scaling parameters between 0 and 1, and colour points lying within the destination gamut have scaling parameters larger than 1. A source colour point lying on the destination gamut boundary has a scaling parameter $\gamma$ of 1. It will be appreciated that other scaling parameters $\gamma$ can be chosen.

Given the values of the scaling parameters $\gamma$ and $\gamma_S$, the translation factor $\tau$ for translating that colour point to a point within the destination gamut can be calculated for the two ranges 304 and 305 in FIG. 3 as:

For $\gamma \leq 1$, $\tau = A * \gamma$

For $\gamma > 1$, $\tau = \dfrac{(1-A)*(\gamma-1)}{(\gamma_s - 1)} + A$ where A is a free parameter in the range $$\dfrac{1}{\gamma_s}$$

to 1 which determines the steepness of the gamut mapping as indicated by 604 in FIG. 6. This corresponds to the position of transition point 308 between the lower range 304 and upper range 305 in FIG. 3. Thus, by adjusting the parameter A, the characteristics of the colour compression performed by the colour processor 500 can be modified.

The free parameter A could be selected from a stored set of parameters for a given source image type, or it could be based on the characteristics of a source image such as the colour content and/or distribution of colours in the image. Alternatively, the free parameter A could be selectable by a user and provided to the gamut mapper 505 as parameter selection 507 in order to optimise the appearance of a colour-compressed image. This can be particularly advantageous because the optimal expression of a given source image in a limited colour gamut can be very subjective, depending on the nature of the image and the perceptions of the particular user. In order to provide the user with a means for optimising the appearance of an image mapped between gamuts by the colour processor, software could be configured to provide an interface through which a user of a data processing system (e.g. a personal computer) comprising the colour processor 500 (embodied in either hardware or software) can adjust parameter A until an optimal converted image is achieved.

For each colour in a received source image 501, the colour characterizer 504 of the colour processor 500 is configured to identify the destination and source gamut boundaries for a respective line of constant hue and luminance 300. This can be achieved by calculating the intersection of the line of constant hue and luminance for the colour point with the respective boundaries of the source and destination colour gamuts specified for the source and output images. The scaling parameters $\gamma$ and $\gamma_S$ required to move the source point along the line of constant hue and luminance to the destination and source gamut boundaries, respectively, can then be identified. The scaling parameter $\gamma$ is indicative of a relationship (e.g. the ratio) between the position of the source colour point on the line 300 and the position of the destination gamut boundary 302 on the line 300. For example, if x is the position of the source colour point on the line 300 and D is the position of the destination gamut boundary 302 on the line 300, then $$\gamma = \dfrac{D}{x}.$$

Similarly, in the present example, the scaling parameter $\gamma_S$ is indicative of a relationship (e.g. the ratio) between the position of the source colour point on the line 300 and the position of the source gamut boundary 303 on the line 300. For example, if x is the position of the source colour point on the line 300 and S is the position of the source gamut boundary 303 on the line 300, then $$\gamma_s = \dfrac{S}{x}.$$

Therefore, by finding the positions on the line 300 of the source colour point (x), the destination gamut boundary (D) and the source gamut boundary (S), the values of the scaling parameters $\gamma$ and $\gamma_S$ can be determined. From $\gamma$ and $\gamma_S$ the translation factor $\tau$ for that colour point can be calculated and applied by gamut mapper 505 so as to effect the colour mapping.

In less preferred examples, the value of $\gamma_S$ is determined as a fixed value for source image 501 and need not be calculated in respect of each source colour point in the image.

The colour points at $\gamma$ values between 0 and 1 are the set of points on the line 300 which lie outside the destination gamut and the colour points at $\gamma$ values between 1 and $\gamma_S$ lie within the destination gamut. As shown in FIG. 3, the colour points lying inside the destination gamut are scaled differently to the colour points lying outside the destination gamut. In this example, the scaling is linear scaling to bring all of the colour points within the destination gamut, but in other examples non-linear scaling could be used.

By way of comparison, FIG. 6 also presents the conventional colour compression techniques of gamut clipping 602 and gamut scaling 604. It will be appreciated that the gamut mapping performed by gamut mapper 505 allows the nature of the colour mapping to blend aspects of gamut clipping with those of gamut scaling, depending on the choice of A and hence the relative steepness of line 601 at $\gamma$ values below and above 1.

The principles set out in the example shown in FIGS. 3 and 6 can be extended to provide greater control over the gamut compression performed by the colour processor 500. A second example will now be described with reference to FIGS. 4 and 7.

FIG. 4 shows the same line 300 of constant hue and luminance through the colour space from the luma axis 301 (U=V=0 in YUV space), through the boundary of the destination colour gamut 302 to the boundary of the source colour gamut 303. In this example, colour points 406 lying outside the destination gamut are mapped to an upper range of colour values 409 within the destination colour gamut, but colour points lying within the destination gamut are split into two sets 404 and 405, with colour points in set 405 being scaled so as to compress those points into range 408 and colour points in set 404 being unchanged. In other examples, the colour points in set 404 could also be scaled but compressed to a different degree to those of set 405.

As for the example described in relation to FIG. 3, in order to identify the value of $\tau$ that is required to translate a given colour point from its source value to its destination value in YUV colour space, the translation factor $\tau$ is expressed with respect to the scaling parameters $\gamma$ and $\gamma_S$. Given the values of the scaling parameters, the translation factor $\tau$ for translating the colour point along its line of constant luminance of hue to a point within the destination gamut can be calculated for the ranges 406, 405 and 404 as:

$$\text{For } \gamma \leq 1, \tau = A*\gamma \quad (4)$$

$$\text{For } \gamma > 1 \text{ and } \gamma \leq B, \tau = \frac{(1-A)*(\gamma-1)}{(B-1)} + A$$

$$\text{For } \gamma > B \text{ and } \gamma \leq \gamma_s, \tau = 1$$

where A is a free parameter in the range $$\frac{1}{\gamma_s}$$

to 1, and B is a free parameter in the range $$\frac{1}{A}$$

to $\gamma_S$ which determines the compression performed by the respective scaling operations performed on colour point sets 405 and 406. The free parameters determine the position of transition points 410 and 411 shown in FIG. 3. Thus, by adjusting the parameters A and B, the characteristics of the colour compression performed by the colour processor 500 can be modified.

Figure 7:
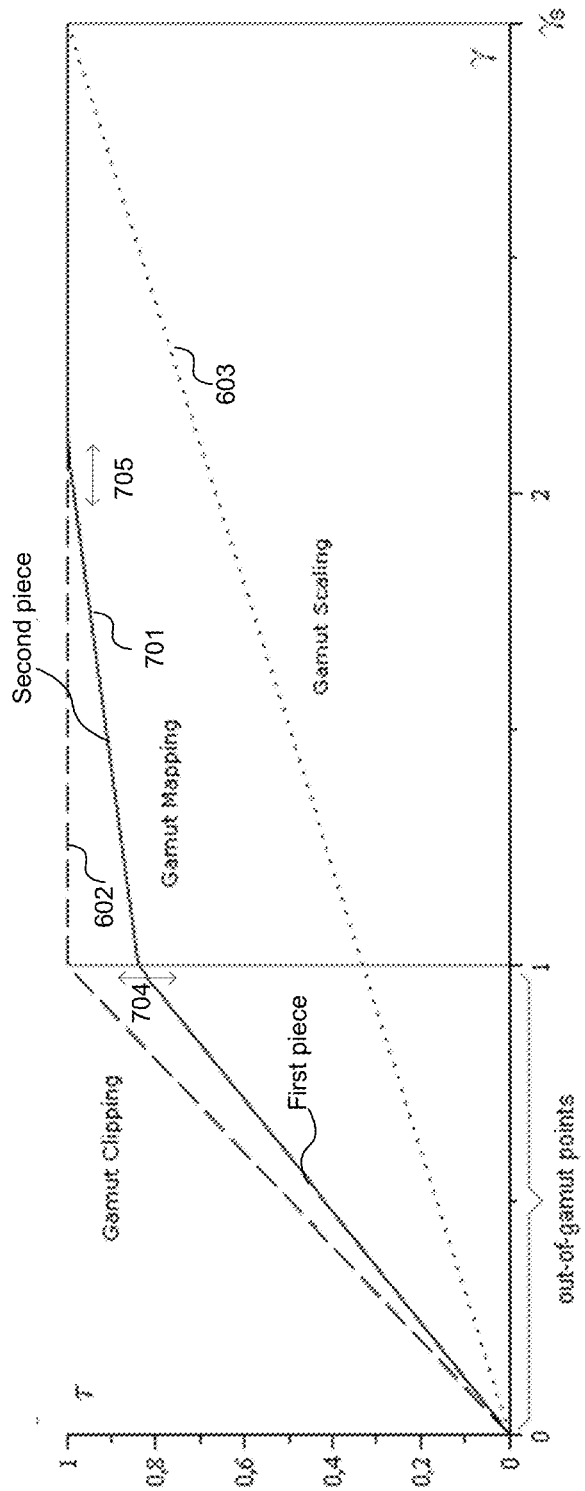
FIG. 7 is a parametric diagram of a 3-piecewise gamut mapping.

FIG. 7 illustrates the relationship between scaling parameter $\gamma$ and translation factor $\tau$ for a line of constant hue and luminance for the second example shown in FIG. 4. Again, the scaling parameter $\gamma$ for a given colour point represents the value of $\tau$ in equation (3) above required to move that colour point along its respective line of constant luminance and hue to the destination gamut boundary. The value of $\tau$ in equation (3) above required to move the colour point along its respective line of constant luminance and hue to the source gamut boundary is given by $\gamma_S$.

Line 701 in FIG. 7 illustrates a relationship between scaling parameter $\gamma$ and translation factor $\tau$ along a line of constant hue and luminance for the example shown in FIG. 4. Colour points lying outside the destination gamut have scaling parameters between 0 and 1, and colour points lying within the destination gamut have scaling parameters larger than 1. A source colour point lying on the destination gamut boundary has a scaling parameter $\gamma$ of 1.

The choice of A and B in equations (4) above determine the properties of the gamut mapping. Parameter A determines the position of transition point 704 in FIG. 7, and parameter B determines the position of transition point 705. The first piece of line 701 as indicated in FIG. 7 corresponds to the set of colour points 406 in FIG. 4, and the second piece of line 701 as indicated in FIG. 7 corresponds to the set of colour points 405 in FIG. 4. Since it is generally desired that the first piece of line 701 should be steeper than the second piece of line 701 (as indicated in FIG. 7), the lower limit for parameter B is determined by parameter A. The choice of A and B determine the steepness of the first and second pieces of line 701 and hence the characteristics of the colour compression performed by the colour processor 500. Source colour points values of $\gamma$ greater than B are clipped to the destination gamut surface.

For each colour in a received source image 501, the colour characterizer 504 of the colour processor 500 is configured to identify the destination and source gamut boundaries for a respective line of constant hue and luminance 300. This can be achieved by calculating the intersection of the line of constant hue and luminance for the colour point with the respective boundaries of the source and destination colour gamuts specified for the source and output images. The scaling parameters $\gamma$ and $\gamma_S$ required to move the source point along the line of constant hue and luminance to the destination and source gamut boundaries, respectively, can then be identified. From $\gamma$ and $\gamma_S$ the translation factor $\tau$ for that colour point can be calculated and applied by gamut mapper 505 so as to effect the colour mapping.

Figure 11:
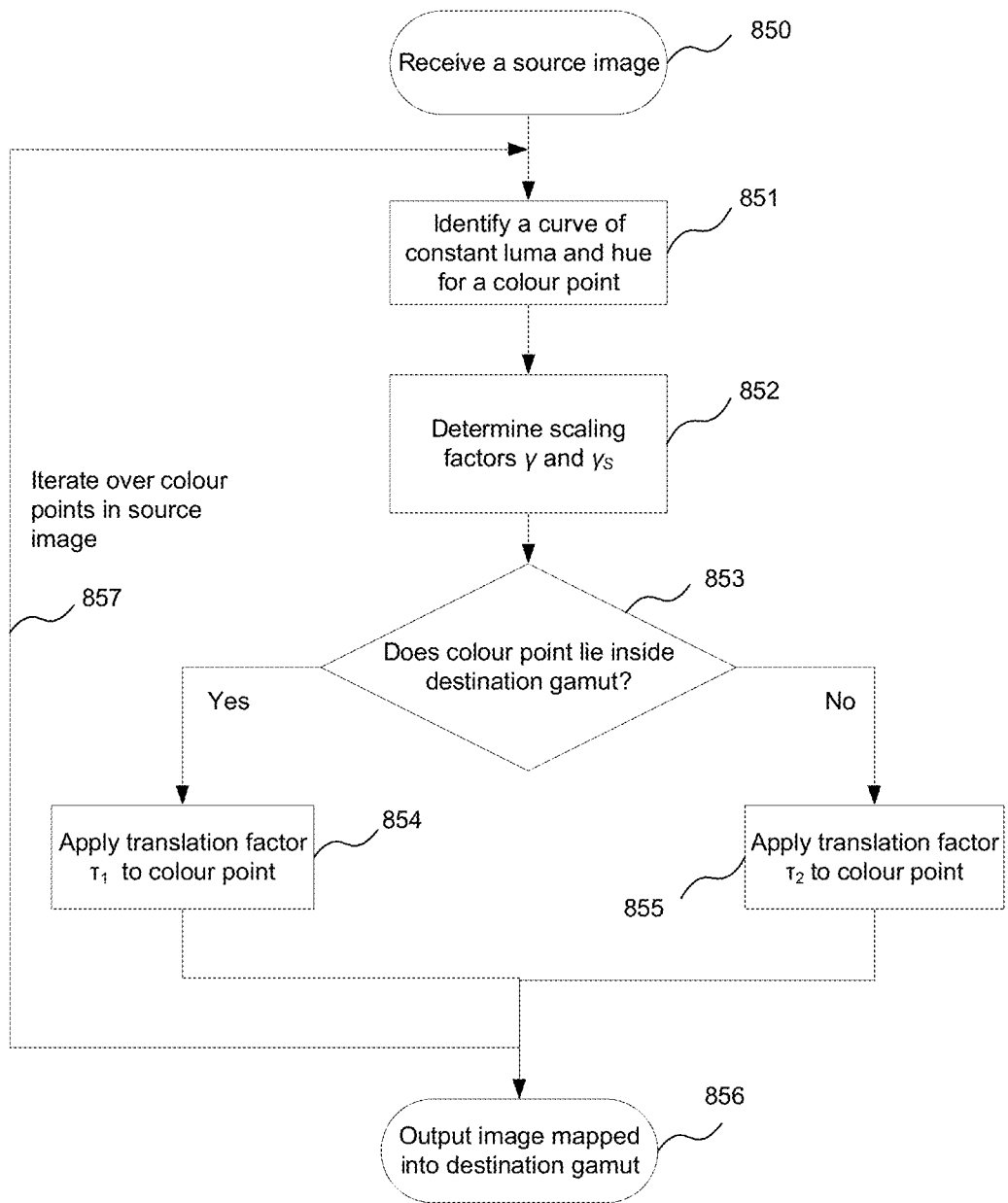
FIG. 11 is a flowchart showing an exemplary method of parametric gamut mapping.

A flowchart illustrating an exemplary method of performing a parametric gamut mapping is shown in FIG. 11. On receiving a source image 850, a curve of constant luma and hue is identified for each colour point in the image 851 and the scaling factors $\gamma$ and $\gamma_S$ (representing relationships between the position of the colour point on the curve and the positions of the destination and source gamut boundaries on the curve, respectively) are determined 852 for the colour point. Identifying the curve of constant luma and hue need not be explicitly performed and could be implicit in the determination of the scaling factors.

At 853 a determination is made as to whether the source colour point lies inside or outside the destination gamut. If the colour point lies inside the boundary of the destination gamut, a translation factor $\tau_1$ is applied 854 to the colour point to translate it into a first range of values in the destination gamut (e.g. indicated by 306 in FIG. 3). In this example $\tau_1$ is given by $$\tau_1 = \frac{(1-A)*(\gamma-1)}{(\gamma_s-1)} + A.$$

Otherwise, a translation factor $\tau_2$ is applied 855 to the colour point to translate it into a second range of values in the destination gamut (e.g. indicated by 307 in FIG. 3). In this example $\tau_2$ is given by $\tau_2 = A*\gamma$. The parameter A is some suitable value between $1/\gamma_S$ and 1 and can be selected so as to optimise the perceived quality of the output image.

The method shown in FIG. 11 is iterated 857 over the colour points of the source image so as to map each colour point in the source image into the destination colour gamut. The mapped image is output at 856.

More generally, the principles of the above parametric approach to performing gamut mapping can be extended so as to translate colours along curves which maintain two colour characteristics constant other than luminance and hue. For example, any two of luminance, hue, chrominance, brightness, lightness, colourfulness, and saturation can be maintained constant. This can be appropriate in colour spaces other than YUV and for particular applications of gamut mapping—e.g. when processing false colour images, or with images processed so as to yield artistic effects or to provide enhancement of particular features in the images.

Pseudo-Perceptual Mapping

Figure 1:
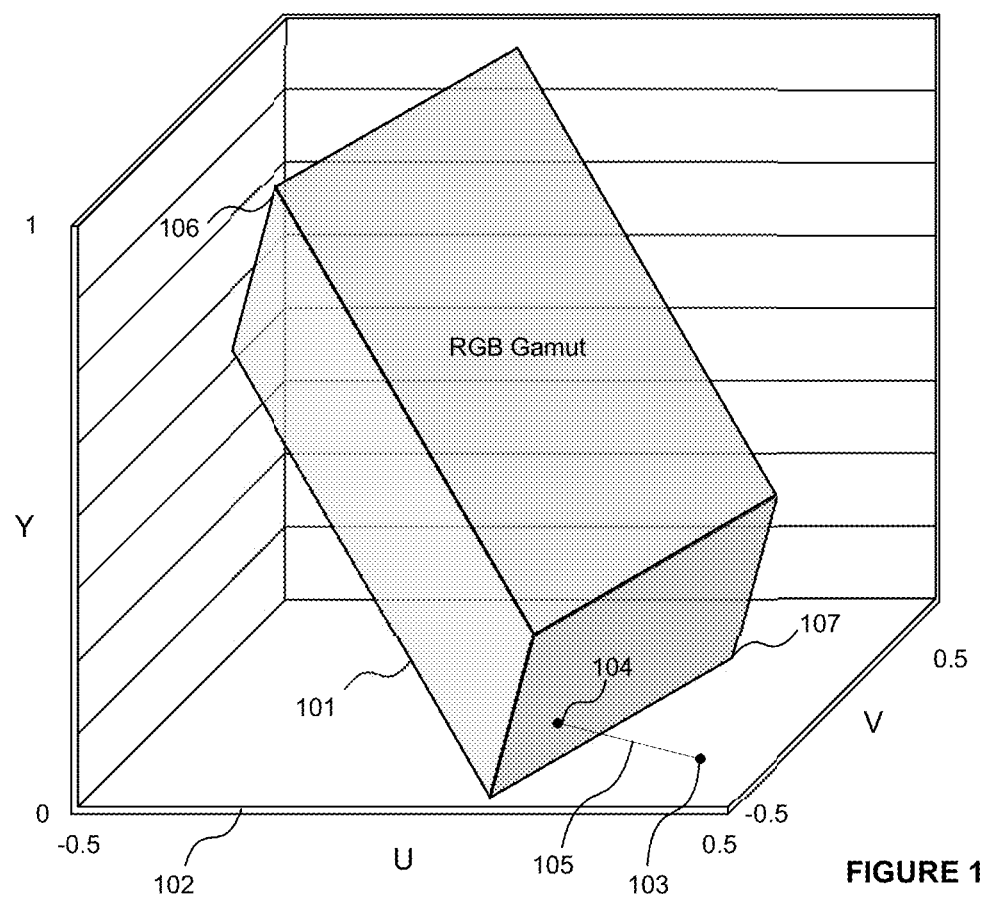
FIG. 1 shows an RGB colour gamut in YUV colour space.
Figure 2:
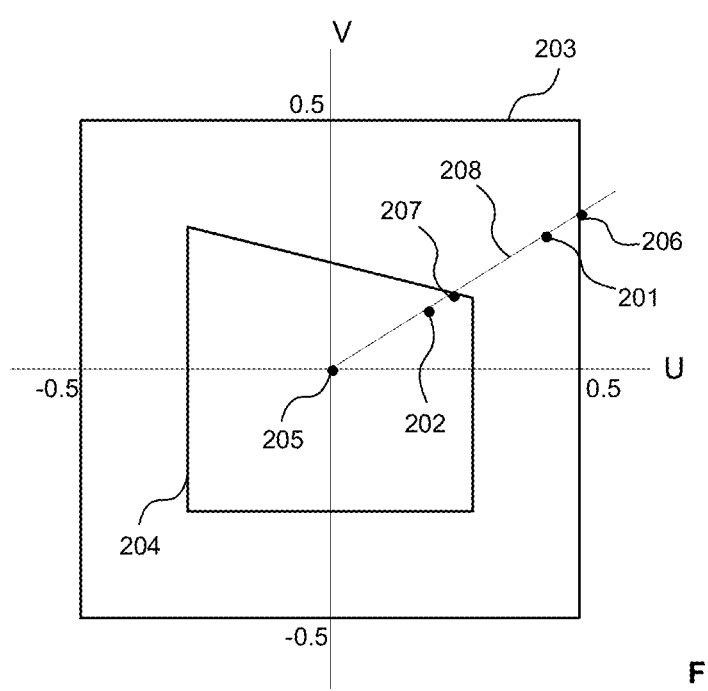
FIG. 2 shows a gamut scaling operation in YUV colour space.

In combination with the above parametric approach to performing gamut mapping or as an alternative to the above parametric approach, a pseudo-perceptual gamut mapping technique can be employed to improve a mapping between colour gamuts. This approach is particularly useful in improving the appearance of images that contain colour gradients (e.g. computer generated or synthetic images), especially where those colours (when represented geometrically in colour space) occur close to the vertices of the destination colour gamut that present a large angle with respect to a colour space axis whose value is being held constant during the mapping. For example, the yellow 106 and blue 107 vertices of the RGB cuboid shown within YUV space in FIG. 1 present a large angle with respect to the luma (Y) axis which is maintained at a constant value during mappings performed using the above parametric approach.

The pseudo-perceptual gamut mapping technique will now be explained by way of example with reference to FIGS. 8 and 9. In this example, the colour space is YUV and the destination gamut is RGB, but more generally the colour space could be any suitable colour space and the destination gamut any suitable colour gamut.

Colour processor 500 can be configured to perform the pseudo-perceptual gamut mapping technique described herein either in combination with the above parametric gamut mapping, or as a modification to a conventional gamut scaling operation (in which case colour characterizer 504 may not be present). The variables C, $C_1$ and $C_2$ described below can be introduced to the gamut mapper 505 as a parameter selection 507, for example from an automated algorithm configured to select appropriate values for the variables (e.g. in dependence on characteristics of the source image 501), or from a user looking to optimise output image 502.

A colour translation in YUV space along a line of constant luminance and hue is set out in equation set (3) above. Rather than maintaining luminance at a constant value during a mapping, the pseudo-perceptual gamut mapping technique modifies luminance during a mapping. In a first example, a colour translation is performed with luma being scaled during a mapping operation such that colour points at large values of U and V are mapped along a curve so as to enter the destination gamut at a point closer to the centre of the destination gamut than would be the case if the mapping were performed at constant luma (representing luminance). As will now be demonstrated with reference to FIG. 10, this helps to mitigate the large errors in saturation which are sometimes introduced close to the vertices of a destination gamut and improving the perceived quality of the colour mapping in these regions.

The origin of the YUV colour space at Y=0.5, U=V=0 typically defines the centre of the destination gamut, but it will be appreciated that the centre of the destination gamut could be anywhere in the YUV colour space within the source gamut. The following example can be readily extended to the case in which the centre of the destination gamut does not lie at the origin of the YUV colour space. The centre of the destination gamut can be calculated in any suitable manner: it could be implicit from the colour space in which the gamut is defined, it could be the centroid of the gamut, a weighted average of the position of some or all of the colour points in the destination gamut, or any other measure of a centre point of the gamut. Whichever the technique used to calculate its position, the centre of the destination gamut need not be determined precisely. The centre of the destination gamut could be a rough approximation determined by any suitable technique—e.g. by determining the centre point using a sparse sampling of colour point positions in the gamut, or by using only the positions of the vertex points of the surface of the colour gamut in an estimate, to give just two examples. A determined centre of the destination gamut could be within, say, 20, 30 or 40% of a "true" measure of the chosen destination gamut centre.

Figure 10:
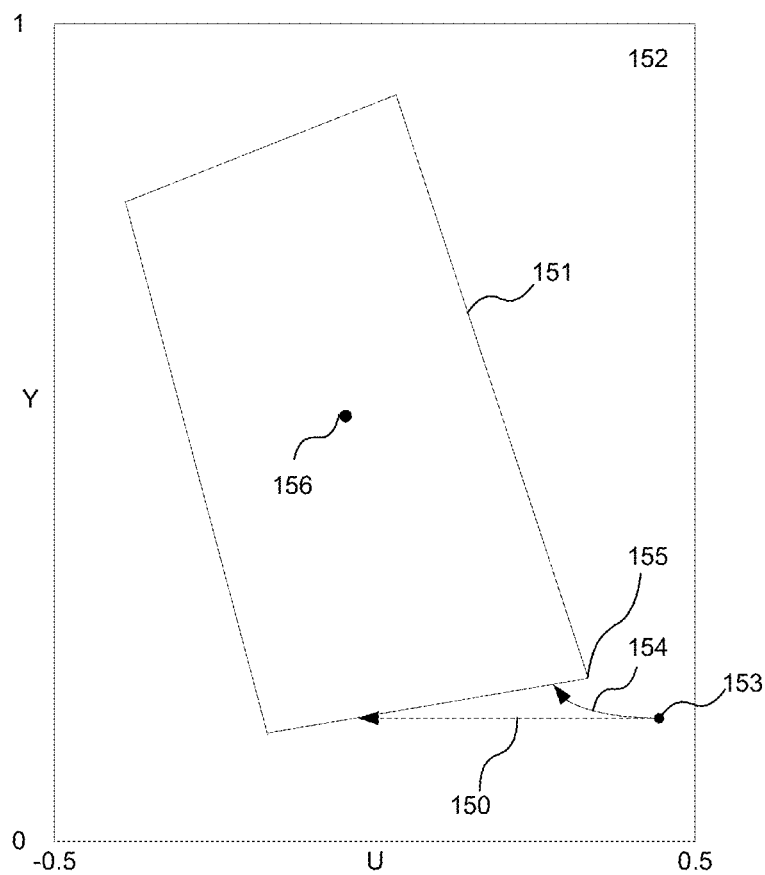
FIG. 10 illustrates a pseudo-perceptual mapping in the U-Y plane of the YUV colour space.

FIG. 10 illustrates a pseudo-perceptual gamut mapping and shows a cross section through the U-Y plane in a YUV colour space 152 which contains a destination colour gamut 151 having a centre 156. With luma Y being maintained constant, colour point 153 would be mapped into the destination colour gamut 151 along line 150, which would introduce a large change in saturation due to the large angle presented by vertex 155 with respect to the luma axis. By introducing a suitable variation in luminance during gamut mapping, point 153 can be mapped along curve 154 so as to enter the destination gamut 151 at a closer point and hence introduce a smaller change in saturation.

In a first example, a gamut mapping transformation can be performed in accordance with the following set of transformations:

$$Y'=Y+(1-\tau)*k(Y)*(U^2+V^2)$$

$$U'=\tau U$$

$$V'=\tau V$$

where $\tau$ is the translation factor introduced in the parametric gamut mapping described above and $k(Y)=C*(1-2Y)$ with C being a free parameter which is greater than or equal to zero whose size can be tuned so as to modify the strength of the modification in luma performed by a mapping operation. This set of transformations represents a mapping operator in this example. For example, it can be advantageous for C to be determined by a user so as to provide the user with a means for optimising the appearance of an image mapped between gamuts by the colour processor. This could be achieved through the provision of appropriate software to provide an interface through which a user of a data processing system (e.g. a personal computer) comprising the colour processor 500 (embodied in either hardware or software) can adjust parameter C until an optimal converted image is achieved.

In a second example, the luma transform in a mapping operator is instead given by:

$$Y'=Y+k_1(Y)*\max(|U|,|V|) \tag{5}$$

where $k_1(Y)=C*(1-2Y)^3$, with C being a free parameter whose size can be tuned so as to optimise a colour mapping of a given source image. This luma transform similarly applies the greatest luma modification to colour points having U and V values which are large in magnitude (such as the blue and yellow vertices of a cuboid describing an RGB gamut). From a computational point of view, finding the maximum of the magnitudes of two numbers is generally more straightforward than calculating the sum of two squares.

Figure 8:
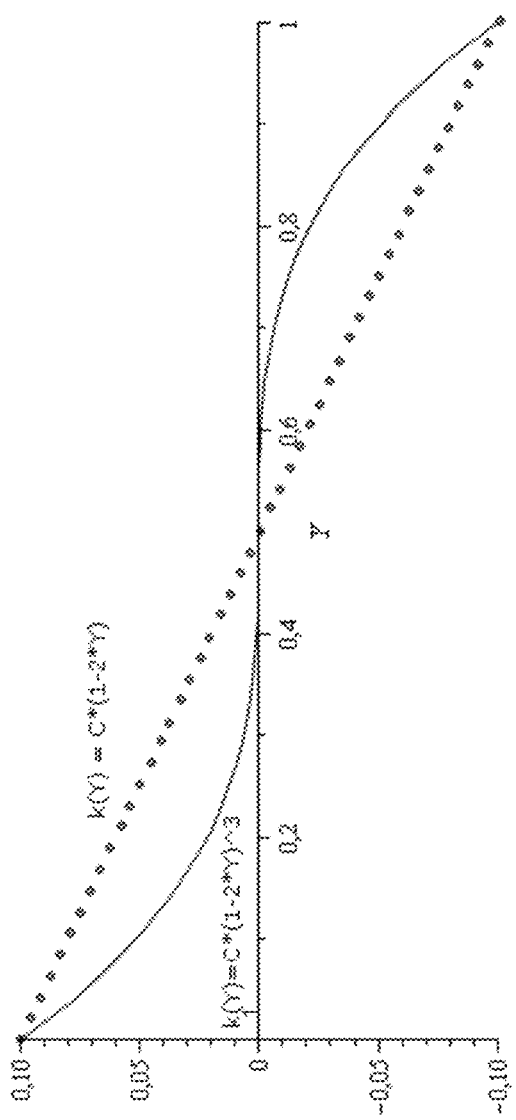
FIG. 8 illustrates a cubic form of parameter k(Y).

The variation of $k_1(Y)$ with Y is illustrated in FIG. 8 for the parameter values C=0.1. It can be seen that $k_1(Y)$ is more selective than k(Y) in the sense that the modification to luma at intermediate values of luma is suppressed so as to minimise the colour distortion introduce by a gamut mapping operation. In FIG. 8, the X-axis represents Y and the Y-axis represents the output of these functions $k_1(Y)$ and k(Y) at different values of Y. The performance of the $k_1(Y)$ function can be appreciated by considering the luma of the vertices of a cuboid representing an RGB gamut:

Cyan Y=0.41
Green Y=0.59
Red Y=0.3
Purple Y=0.7
Blue Y=0.11
Yellow Y=0.89

It can be seen from the above luma values that colour points close to the blue and yellow vertices will experience the largest modification in luma during a mapping operation as the factor $(1-2Y)^3$, contained in k(Y) achieves its smallest (Y=0.11, Blue) and largest (Y=0.89, Yellow) values among all the ones corresponding to the other vertices of the operating gamut (Red, Purple, Green and Cyan). The corners corresponding to black and white would correspond to an even larger value of such factor, but they lie in the U=V=0 axis so the contribution of the factor is mitigated by the term max (|U|, |V|) in equation (5) above.

The performance of the k(Y) function can be further improved through the use of higher order polynomials so as to move the peak values of the function away from the extremes of luma towards the values of Y at which the blue and yellow vertices occur. This is because the greatest colour distortion when operating in YUV colour gamuts occurs close to the blue and yellow vertices, not at the extremes of luma (the black and white vertices). A third example of the luma transform in a mapping operator is illustrated in FIG. 9, which is a plot of the following function $k_2(Y)$ versus Y.

$$k_2(Y)=C_2*(2Y-1)^5+C^3(1-2Y)^3$$

Figure 9:
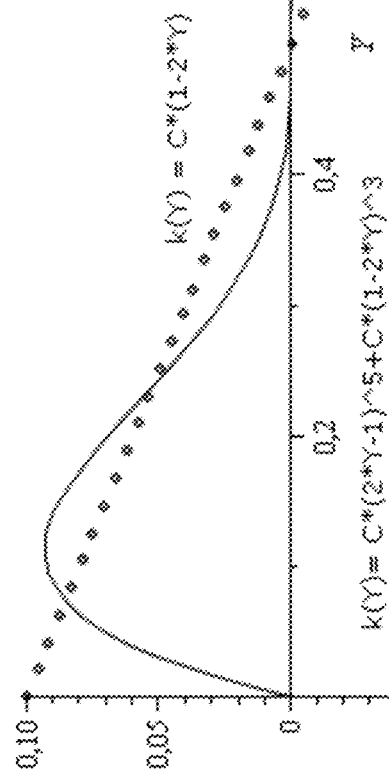
FIG. 9 illustrates a higher order form of parameter k(Y).

In FIG. 9, the X-axis represents Y and the Y-axis represents the output of functions $k_2(Y)$ and k(Y) at different values of Y. The parameters C2 and C3 can take the same or different values. In the example shown in FIG. 9 the values are the same, C2=C3=C. It will be appreciated that many variations can be made to the above examples whilst providing a gamut mapping scheme in which luminance is modified during a mapping operation in accordance with the principles taught herein.

Figure 12:
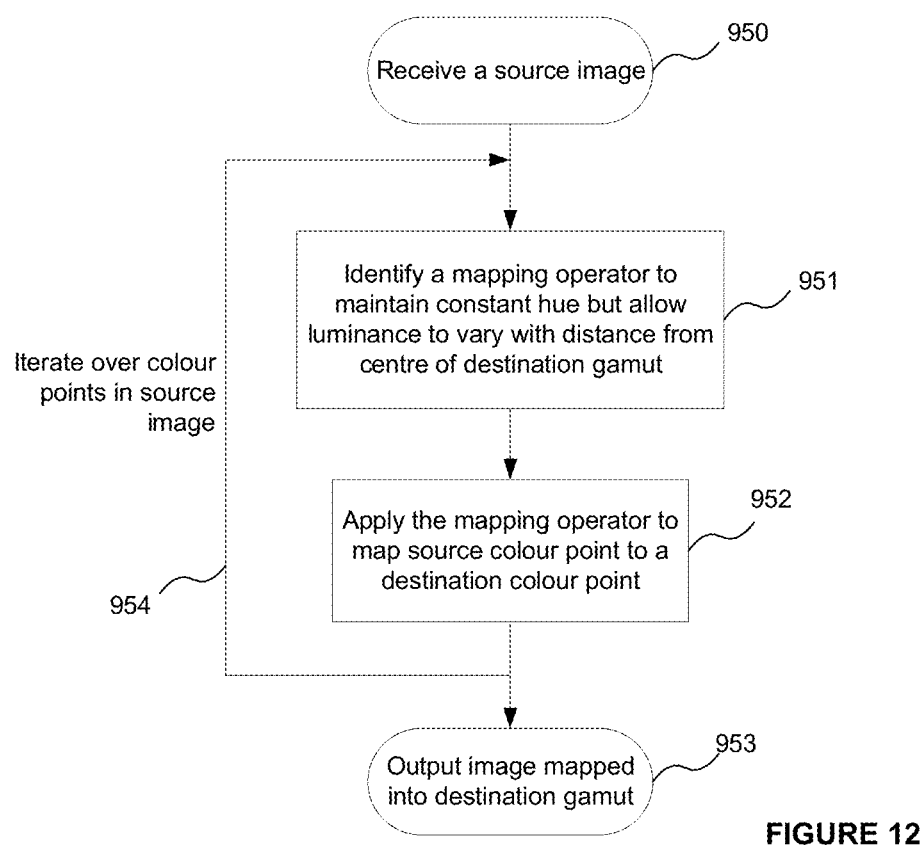
FIG. 12 is a flowchart showing an exemplary method of pseudo-perpetual mapping.

A flowchart illustrating an exemplary method of performing a pseudo-perceptual mapping is shown in FIG. 12. On receiving a source image 950, a mapping operator is identified 951 for each source colour point for mapping that source colour point to a destination colour point within the destination colour gamut along a curve of constant hue and varying luminance—e.g. a curve expressed by the mapping operator whose luminance varies with distance from the centre of the destination colour gamut according to the luma transform (5) above. The mapping of the U and V components of the source colour point can be performed according to the parametric gamut mapping approach described above or any other technique for mapping a colour point into a new gamut at constant hue. A given mapping operator is applied to its respective colour point 952 and the process is iterated over the colour points of the source image 954 in order to generate an output image 953 mapped into the destination gamut.

A colour point can be any kind of representation of a colour in an image according to the respective colour space of that image. For example, a colour point can be the colour value of a pixel in a digital image expressed in an RGB colour space within some defined gamut.

The value of a substantially constant value can be maintained within a few percent (e.g. 2, 3, 4, or 5 percent) of its initial or average value, or exactly at a constant value.

The colour processor of FIG. 5 is shown as comprising a number of functional blocks. This is for illustrative purposes only and is not intended to define a strict division between different parts of hardware on a chip or between different programs, procedures or functions in software. For example, the gamut mapper could comprise the colour characterizer. The term logic as used herein can refer to any kind of software, hardware, or combination of hardware and software.

Colour processors configured in accordance with the present invention could be embodied in hardware, software or any suitable combination of hardware and software. A colour processor of the present invention could comprise, for example, software for execution at one or more processors (such as at a CPU and/or GPU), and/or one or more dedicated processors (such as ASICs), and/or one or more programmable processors (such as FPGAs) suitably programmed so as to provide functionalities of the data processing device, and/or heterogeneous processors comprising one or more dedicated, programmable and general purpose processing functionalities. In preferred embodiments of the present invention, the colour processor comprises one or more processors and one or more memories having program code stored thereon, the data processors and the memories being such as to, in combination, provide the claimed colour processor and/or perform the claimed methods.

The term software as used herein includes executable code for processors (e.g. CPUs and/or GPUs), firmware, bytecode, programming language code such as C or OpenCL, and modules for reconfigurable logic devices such as FPGAs. Machine-readable code includes software and code for defining hardware, such as register transfer level (RTL) code as might be generated in Verilog or VHDL.

Any one or more of the algorithms and methods described herein could be performed by one or more physical processing units executing program code that causes the unit(s) to perform the algorithms/methods. The or each physical processing unit could be any suitable processor, such as a CPU or GPU (or a core thereof), or fixed function or programmable hardware. The program code could be stored in non-transitory form at a machine readable medium such as an integrated circuit memory, or optical or magnetic storage. A machine readable medium might comprise several memories, such as on-chip memories, computer working memories, and non-volatile storage devices.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. A processor for mapping a source colour point expressed according to a source colour gamut to a destination colour point expressed according to a destination colour gamut, the processor comprising:
   a colour characterizer configured to
      determine a first scaling parameter in dependence on a curve that passes through the source colour point, the boundary of the source colour gamut and the boundary of the destination colour gamut, and
      determine a second scaling parameter in dependence on the curve; and
   a gamut mapper configured to
      calculate a first translation factor in dependence on the first and second scaling parameters and calculate a second translation factor in dependence on the first scaling parameter, and
         if the source colour point lies inside the destination colour gamut, apply the first translation factor so as to translate the source colour point to a destination colour point within a first range of values on the curve, and if the source colour point lies outside the destination colour gamut, apply the second translation factor, different than the first translation factor, so as to translate the source colour point to a destination colour point within a second range of values on the curve;

wherein the first and second ranges of values lie within the destination colour gamut.

2. The processor as claimed in claim 1, wherein the first scaling parameter is indicative of a relationship between the position of the source colour point and a position of intersection of the boundary of the destination colour gamut with the curve.

3. The processor as claimed in claim 1, wherein the second scaling parameter is indicative of a relationship between the position of the source colour point and a position of intersection of the boundary of the source colour gamut with the curve.

4. The processor as claimed in claim 1, wherein the first and second ranges of values on the curve are adjacent ranges delineated by a first transition point.

5. The processor as claimed in claim 4, wherein the gamut mapper is configured to determine the first transition point in dependence on a user-selected variable.

6. The processor as claimed in claim 1, wherein the curve is defined according to a predetermined set of constraints, the predetermined set of constraints being such as to maintain two or more of luminance, hue, chrominance, brightness, lightness, colourfulness, and saturation colour characteristics substantially constant at all colour points along the curve.

7. The processor as claimed in claim 1, wherein the colour characterizer is further configured to calculate the first scaling parameter as a ratio of the position of the source colour point on the curve with respect to the position of intersection of the boundary of the destination colour gamut with the curve.

8. The processor as claimed in claim 1, wherein the colour characterizer is further configured to calculate the second scaling parameter as a ratio of the position of the source colour point on the curve with respect to the position of intersection of the boundary of the source colour gamut with the curve.

9. The processor as claimed in claim 1, wherein the operating colour space is a YUV colour space, and the curve represents a line of constant luminance and hue.

10. The processor as claimed in claim 9, wherein the gamut mapper is further configured to determine, in respect of each of the source colour gamut or destination colour gamut, the translation factor required to multiply the U and V coordinates of the source colour point so as to translate the source colour point along the curve to the boundary of the respective source or destination colour gamut.

11. The processor as claimed in claim 9, wherein the gamut mapper is further configured to determine the destination colour point by multiplying the U and V coordinates of the source colour point by the first or second translation factor, as applicable to the source colour point.

12. The processor as claimed in claim 1, wherein the first range of values on the curve extend between the centre of the destination colour gamut and a first transition point, and the second range of values on the curve extend between the first transition point and the boundary of the destination colour gamut.

13. The processor as claimed in claim 1, wherein the gamut mapper is further configured to clip the source colour point to the destination gamut boundary if, on applying the second translation factor, the destination colour point would lie outside the destination gamut.

14. The processor as claimed in claim 1, further comprising a colour space converter configured to convert the translated colour point from the operating colour space to a destination colour space so as to provide an output image expressed according to the destination colour space and destination colour gamut.

15. The processor as claimed in claim 1, wherein the curve is a line, the line being a curve with null curvature.

16. The processor as claimed in claim 1, wherein the curve represents a line of constant luminance and hue.

17. A method of mapping a source colour point expressed according to a source colour gamut to a destination colour point expressed according to a destination colour gamut, the method comprising:

determining a first scaling parameter in dependence on a curve that passes through the source colour point, the boundary of the source colour gamut and the boundary of the destination colour gamut;

determining a second scaling parameter in dependence on the curve;

calculating a first translation factor in dependence on the first and second scaling parameters;

calculating a second translation factor in dependence on the first scaling parameter;

determining whether the source colour point lies inside or outside the destination colour gamut, and in response to determining that the source colour point lies inside the destination colour gamut, applying the first translation factor so as to translate the source colour point to a destination colour point within a first range of values on the curve, or in response to determining that the source colour point lies outside the destination colour gamut, applying the second translation factor so as to translate the source colour point to a destination colour point within a second range of values on the curve;

wherein the first and second ranges of values lie within the destination colour gamut.

18. The method as claimed in claim 17, wherein the curve is a line, the line being a curve with null curvature.

19. A non-transitory machine readable storage medium having stored thereon machine readable instructions that, when processed at a computer system, cause the computer system to implement a method of mapping a source colour point expressed according to a source colour gamut to a destination colour point expressed according to a destination colour gamut, the method comprising:

determining a first scaling parameter in dependence on a curve that passes through the source colour point, the boundary of the source colour gamut and the boundary of the destination colour gamut;

determining a second scaling parameter in dependence on the curve;

calculating a first translation factor in dependence on the first and second scaling parameters;

calculating a second translation factor in dependence on the first scaling parameter;

determining whether the source colour point lies inside or outside the destination colour gamut, and in response to determining that the source colour point lies inside the destination colour gamut, applying the first translation factor so as to translate the source colour point to a destination colour point within a first range of values on the curve, or in response to determining that the source colour point lies outside the destination colour gamut, applying the second translation factor so as to translate the source colour point to a destination colour point within a second range of values on the curve;

wherein the first and second ranges of values lie within the destination colour gamut.

20. The non-transitory machine readable storage medium as claimed in claim 19, wherein the curve is a line, the line being a curve with null curvature.

* * * * *